June 20, 1933.   L. H. VON OHLSEN ET AL   1,914,545
SYSTEM AND APPARATUS FOR REGULATION
Filed March 20, 1930   2 Sheets-Sheet 2

Fig. 3.

Patented June 20, 1933

1,914,545

UNITED STATES PATENT OFFICE

LOUIS H. VON OHLSEN AND FRANK W. GODSEY, JR., OF NEW HAVEN, CONNECTICUT, ASSIGNORS TO THE SAFETY CAR HEATING & LIGHTING COMPANY, A CORPORATION OF NEW JERSEY

SYSTEM AND APPARATUS FOR REGULATION

Application filed March 20, 1930. Serial No. 437,430.

This invention relates to electric regulation and more particularly to an apparatus and system for the regulation of alternating current circuits.

One of the objects of this invention is to provide a thoroughly practical and simple system and apparatus for regulating the output of a source of alternating current or for regulating a function of alternating current energy in a work or translation circuit. Another object is to provide an apparatus and system of the above-mentioned character that will be inexpensive, of dependable and reliable action, and capable of long-continued service. Another object is to provide a regulating apparatus of the above-mentioned character that will be of accurate action, sensitive yet free from hunting action, and also rugged and durable. Another object is to provide a regulating apparatus and system of the carbon pile type adapted for thoroughly practical and dependable action in the alternating current power field. Another object is to provide an apparatus and system of the above-mentioned character that will be well adapted to meet the widely varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
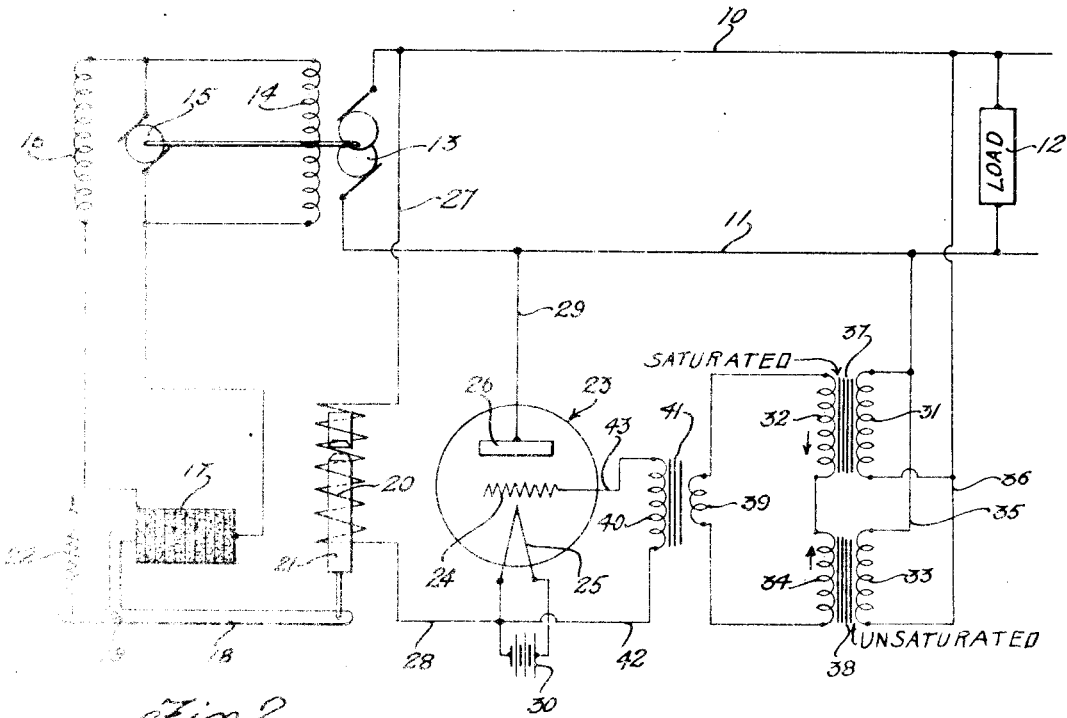
Figure 2:
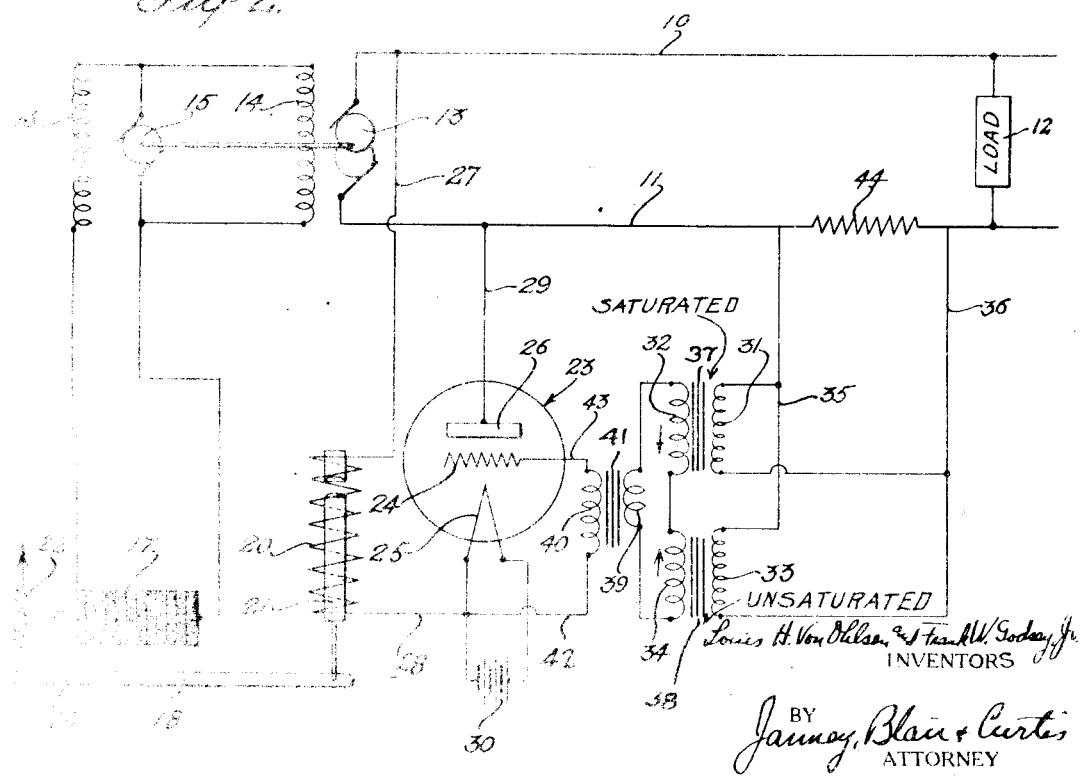

In the accompanying drawings in which are shown several of various possible embodiments of our invention, Figure 1 shows diagrammatically a preferred form of regulating system and apparatus, the latter being shown as applied to the regulation of voltage;

Figure 2 shows diagrammatically a system and apparatus for current-control or regulation, and Figure 3 shows diagrammatically a possible modified form of the system and apparatus.

Similar reference characters refer to similar parts throughout the several views of the drawings.

Referring now to Figure 1 of the drawings, we have shown a main alternating current circuit 10—11 supplying alternating current to a load 12 of any suitable form, the main line 10—11 being supplied with energy from a suitable source of alternating current illustratively taking the form of an alternator 13 having an exciting field 14 energized by an exciter 15. The exciter 15 may take any suitable form and may, for example, be a shunt wound direct current generator having, hence, a shunt field winding 16. The excitation supplied by the exciter 15 to the field winding of the alternator 13 may be controlled in any suitable manner, preferably, however, by controlling the excitation of the exciter generator 15; hence, there is included in the circuit of the shunt field 16 a carbon pile 17 the pressure upon which, and hence the resistance of which, may be varied, for example, by means of a bell crank lever 18, pivoted as at 19, and having a solenoid winding 20 acting, through the core 21, in a direction to relieve the pressure on the carbon pile 17, and having a spring 22, preferably adjustable, for opposing the action of the winding or coil 20.

The coil 20 and the magnetic circuit to which it is related are designed and constructed, in a manner known to those skilled in the art, so that the winding 20, when energized by a certain value of uni-directional current, will hold the core 21 in whatever position it has been moved within its range of movement. Coil 20 is energized by uni-directional current derived by rectification of alternating current derived from the alternator 13 and any suitable form of rectifier may, insofar as certain features of our invention are concerned, be employed. Preferably the rectifier is of the thermionic type and in Figure 1 we have shown the rectifier at 23 as taking the form preferably of a three-element thermionic device and having, therefore, a control grid or control element 24 for controlling the uni-directionally conductive electronic conduction path extending between the filament cathode 25 and the plate anode 26. This uni-directionally conductive path is included in circuit with the coil 20.

More specifically, this energizing circuit of the coil 20 will be seen to extend from main line conductor 10 by way of conductor 27 to one terminal of the coil 20, and thence by way of conductor 28 to the cathode 25, a conductor 29 leading from the anode 20 to the other line wire 11. Any suitable source of energy may be used to heat the cathode 25 for appropriate thermionic emission and by way of illustration we have indicated such a source diagrammatically as taking the form of a suitable battery 30.

The coil 20 will thus be energized by a uni-directional current and the coil 20 and its associated parts and the constants of the circuit in which the coil 20 is included are so designed or constructed, with respect to the alternating potential across the circuit 10—11, that the coil 20 will hold the core 21 in whatever position it has been moved as long as the alternating potential of the circuit from which the uni-directional current energizing the coil 20 is derived is at substantially its normal or intended value and the potential applied to the grid or control element 24 of the thermionic device 23 is at a certain value, preferably, as is more clearly described hereinafter, at a value of zero.

Should the alternating potential of the circuit 10—11 change or vary, such change or variation will affect, in substantially direct proportion, the magnitude of the uni-directional current energizing the coil 20; thus, should the alternating potential drop, the energization of the coil 20 correspondingly diminishes, while an increase in the alternating potential causes a substantially commensurate increase in the uni-directional current energizing the coil 20. Such changes in the energization of coil 20 disturb the equilibrium theretofore maintained between the coil 20 and its associated moving parts, on the one hand, and the spring 22, on the other hand, resulting in corresponding changes in the resistance of the carbon pile 17 and like changes in the excitation and hence in the potential of the alternator 13 to restore the alternating potential across the circuit 10—11 to normal.

Accompanying such changes in the function of the output of the alternator 13 which is to be maintained substantially constant and illustratively, in the arrangement of Figure 1, in the alternating potential of the alternator 13, there are brought about, in accordance with certain other features of our invention, changes in the potential of the control element or grid 24 of the vacuum tube 23, and in order that these features of our invention may be more readily understood, it might first be pointed out that we provide two transformers 31—32 and 33—34 whose primary windings 31 and 33, respectively, are connected in parallel, by conductors 35 and 36, to be responsive to the alternating potential of the circuit 10—11 which is to be regulated or maintained constant. The transformer windings are mounted upon a suitable core or cores and we have diagrammatically indicated, at 37, the core of the transformer 31—32, and at 38 the core of the transformer 33—34. These two transformers are constructed, in any suitable manner, to have relative characteristics, as are described in detail hereinafter.

The secondary windings 32 and 34 of the two transformers are connected in series with each other but in such a way that the potentials thereof are in opposition to each other, and these serially connected secondary windings 32 and 34 are in turn connected to the low tension winding 39 of a relatively high ratio step-up transformer whose relatively high tension winding is indicated at 40, the two windings 39 and 40 being appropriately related to a suitable core 41. Conductors 42 and 43 connect the winding 40 across the cathode 25 and the grid 24 of the vacuum tube 23.

The two transformers 31—32 and 33—34 are constructed dissimilarly so that, though the primary windings 31 and 33 respond to the same change or changes in the alternating potential to be regulated, the secondary windings 33 and 34 respond in preferably relatively widely differing degrees to the inductive or electromagnetic effects caused by the primary windings 31 and 33, respectively. Conveniently the two transformers may be constructed so that the one operates at a different flux density from that of the other.

For example, the transformer 31—32 may be constructed so that, when the primary winding 31 is energized by the normal or intended value of the alternating potential across the line 10—11, the core 37 is substantially saturated or is operating at a point in its saturation curve substantially at or even above the knee, while the transformer 33—34 is constructed so that when the primary winding 33 is energized by the normal or intended value of the alternating potential to be regulated against changes, the core 38 is operating at a point in the relatively steep portion of its saturation characteristic, for example, a point below the knee. The secondary windings 32 and 34 have sufficient turns therein so that, under the above described conditions of energization of the primary windings 31 and 33 at the normal alternating potential, the alternating potentials induced therein are equal.

The secondary windings 32 and 34, being connected as above pointed out in opposition to each other, are, as long as the potential across the circuit 10—11 is normal, effective therefore to produce equal and opposite voltages in the circuit of the primary winding 39 of the transformer 39—40, with the result that no potential is applied to the low tension winding 39 of the latter transformer and the grid 24 is at substantially zero potential.

If now the potential of the circuit 10—11 increases, the primary windings 31 and 33 respond to this increase but, due to the above-mentioned relative characteristics of the two transformers, the potential induced in the secondary winding 34 of the transformer 33—34 increases at a much more rapid rate than does the potential induced in the winding 32 of the transformer 31—32. There results, therefore, a potential applied to the winding 39 of transformer 39—40 which is equal to the difference between the potentials of the secondary windings 34 and 32 and, moreover, in a direction determined by the higher potential of the two induced voltages.

The potential thus energizing the winding 39 is stepped up and amplified by the transformer action of the transformer 39—40 and is applied to the control grid 24. Moreover, the various circuit connections are such that the alternating potential applied to the control grid 24, when the potential of secondary winding 34 exceeds that of the secondary winding 32, is in such a direction and in such phase relation with respect to the alternating potential applied to the plate 26 of the thermionic device 23, that the potential of the grid 24 is raised from zero in a relatively positive direction, thus causing a greatly increased flow of space current between the cathode 25 and the plate anode 26 than has taken place as a result of the increase in the alternating potential applied directly to the circuit of coil 20 and the rectifier 23.

The current energizing the winding 20 is thus much more rapidly increased and the pressure on and the resistance of the carbon pile 17 is quickly changed to restore the potential of the circuit 10—11 to its normal value.

Should the alternating potential across the circuit 10—11 decrease from its normal value, the voltage induced in the secondary winding 32 decreases less rapidly than the voltage induced in the secondary winding 34 with the result that the voltage of the winding 32 becomes preponderant in the circuit of the primary winding 39 of transformer 39—40 and hence the winding 39 will be energized by an alternating potential equivalent to the difference between the potentials of the windings 32 and 34 but 180° out of phase with respect to the potential that was effective upon the winding 39 when the voltage of the secondary winding 34 was preponderant over the voltage of the winding 32. The control grid 24 will thus have applied thereto an alternating potential 180° out of phase from the potential applied thereto when the voltage of the winding 34 was preponderant over the voltage of the winding 32, changing the potential of the grid 24, from zero, in a relatively negative direction, and at a rate increasing with the rate of increase of the difference between the induced potentials of the windings 32 and 34, this difference being amplified by the step-up transformer 39—40. The space current flowing between the cathode 25 and the plate anode 26 is thus relatively very rapidly diminished with a correspondingly rapid decrease in the energization of coil 20. The disturbance of the equilibrium between the solenoid 20—21 and the spring 22 results in the latter so increasing the pressure on and decreasing the resistance of the carbon pile 17 that the alternating potential of the alternator 13 is promptly restored to normal.

Thus departures from the normal potential are quickly and rapidly rectified, it being noted that the differential action of the two transformers 31—32 and 33—34 achieves, due to the dissimilar characteristics thereof as above pointed out, an amplification of any departures from the normal potential and that the step-up transformer 39—40, as well as the amplifying action of the three-element thermionic device 23, accomplishes a still further amplification of the effects due to any departure from the normal or intended alternating potential. Thus we are enabled to achieve positive and accurate and sensitive control and regulation.

In the above described system and apparatus of Figure 1, we have illustrated certain features of our invention as effecting the regulation of an alternating current circuit or system for constancy of the alternating potential thereof and, more specifically, for achieving constancy of the potential of the output of an alternator. In Figure 2 we have illustrated diagrammatically a system and apparatus for achieving the regulation of an alternating current circuit or system for constancy of current flow therein and, more specifically, for the regulation of the output of an alternator for constancy of current. The primary windings 31 and 33 of the transformers 31—32 and 33—34 are shown in Figure 2 as connected to be responsive to current changes, above or below a value intended to be maintained constant, in the circuit 10—11, and by way of illustration these primary windings may be connected in parallel and shunted about a suitable resistance 44 interposed in the circuit in which constancy of current is to be maintained. The transformer primaries 31 and 33 are thus made to respond to changes in the potential drop across the resistance 44 that are caused by departures from the value of the current intended to be maintained constant, it being understood, of course, that the transformers are constructed to function at an appropriate potential or potentials to meet the circuit arrangement of Figure 2 while retaining the dissimilarities above pointed out in connection with the arrangement of Figure 1.

The functioning and operation of the system and apparatus of Figure 2 will be clear, it is believed, in view of what has been said hereinabove in connection with Figure 1, but it may here be pointed out that an increase in the current flow in the circuit 10—11 above the normal value results in an increase in the potential drop across the resistance 44 while a decrease in the normal current flow results in a decrease in the potential drop across this resistance. The responses and subsequent actions of the apparatus to these changes in potentials are substantially similar to those described in detail in connection with Figure 1.

Turning now to Figure 3, in which we have illustrated a possible modified form of our invention, it might at first be pointed out that, in Figure 3, we have also shown another one of various ways in which a carbon pile variable resistance may be utilized for the regulation of a function of the output of a source of alternating current. In Figure 3 we have shown an alternating current supply circuit 10—11, supplying energy to a suitable load 12 from any suitable source, the latter being diagrammatically shown as an alternator 13. The carbon pile 17 is inserted directly in the circuit between the source 13 and the load 12 and is, of course, of an appropriate current-carrying capacity. Constancy of the potential applied to the load 12 is achieved by changing the potential drop in the carbon pile 17 to compensate against increases in the potential of the source 13 above the potential desired to be applied to the load 12.

The solenoid winding or coil 20 is, in Figure 3, connected across the circuit 10—11 through an electronic conduction device, unidirectional in conductivity, shown in the form of a three-element thermionic vacuum tube 23, as in Figures 1 and 2, the coil 20 being thus supplied with uni-directional energizing current and connected also to be responsive to the changes, in potential, against which the circuit is to be controlled.

The control grid 24 of the thermionic device 23 and the cathode 25 are connected across the terminals of a winding 45 extending about the middle leg 46 of a shell type of core, generally indicated at 47, and having potential windings 48 and 49 about the end legs 50 and 51 of the core 47. The windings 48 and 49 are connected to be responsive to changes in the alternating potential to be regulated and hence are connected across the conductors 10—11 on the load side of the carbon pile 17, and are conveniently connected in series and thus serially connected are in turn bridged across the circuit 10—11 by conductors 52 and 53. The windings 48 and 49, moreover, are so related to the core 47 or are so connected that their respective fluxes, in the middle leg 46, are in opposition and, furthermore, are equal when the alternating potential across the circuit 10—11 is normal; under these circumstances, there is no potential induced in the winding 45 and the potential of the control grid 24 is zero, a condition corresponding to that existing in the arrangements of Figures 1 and 2 when the induced voltages in the secondary windings 32 and 34 are equal.

The magnetic circuits of the windings 48 and 49 are so constructed or proportioned with respect to each other and with respect to the windings themselves that either the saturation characteristics are different or the operation or functioning takes place at portions of different slope in the saturation characteristics.

For example, the winding 48 and its magnetic circuit may be so related to each other that, when normal potential obtains across the circuit 10—11, these parts are operating substantially at or above the knee of the saturation curve while winding 49 and its magnetic circuit function, when normal potential exists across the circuit 10—11, at a point substantially below the knee in the saturation curve. Should the alternating potential across the conductors 10—11 increase beyond this normal value, the rate of increase of flux produced by the winding 49 in the middle leg 46 is greater than the rate of increase of flux, due to the winding 48, in the middle leg 46, causing the flux of the winding 49 to preponderate over the flux produced in the winding 48, thus setting up an alternating potential in the winding 45 effective to change the potential of the control grid 24 from zero in a positive direction relative to the potential applied to the plate anode 26. The space current flowing from the cathode 25 to the plate anode 26 is thus rapidly increased and, moreover, at a rate greater than the rate of increase due to the increase in alternating potential applied directly to the circuit of the coil 20 and the rectifier 23. The coil 20 then acts to increase the resistance of the carbon pile 17 sufficiently to restore the alternating potential energizing the windings 48 and 49 to normal, thus restoring the condition of zero potential in the winding 45 and on the grid 24.

Should the alternating potential across the circuit 10—11 decrease below the normal value, the rate of decrease of flux in the middle leg 46 produced by the winding 49 is greater than the rate of decrease of flux of the middle leg 46 produced by the winding 48, the flux of the latter winding therefore preponderating and inducing an alternating potential in the winding 45 which, however, will be 180° out of phase from that which was induced therein due to the preponderance of the flux produced by the coil 49 when the alternating potential to be regulated rose above the normal or intended value. The potential of the control grid 24 is thus changed from zero in a negative direction, causing the space current in the circuit of the rectifier 23 and the winding 20 rapidly to diminish and, moreover, at a rate greater than the decrease that results directly from the decrease in the potential applied to the circuit of winding 20 and the rectifier 23. This lessened energization of the winding 20 permits the resistance of the carbon pile 17 to be quickly diminished sufficiently to lessen the potential drop therein and restore the alternating potential across the load to normal, restoring also the condition of zero potential induced in the winding 45.

Thus it will be seen that changes in the function to be regulated are multiplied or amplified by the differential action that takes place due to the inter-relation of the windings on the core 47 and that a further amplification is achieved by the action of this amplified effect upon the control grid 24, these amplifying actions supplementing the direct response of the carbon pile controlling coil 20 to the changes in the function of the current to be regulated. The action is therefore rapid, sensitive and accurate, and thus dependability and precision of regulation are effectively achieved. In connection with Figure 3, it might be noted that, while the windings 48 and 49 are shown to be responsive to the potential function of the energy supplied to the load 12, these coils may be made responsive to any other suitable function of the energy, such as the current, in a manner that is clear from the arrangement above described in connection with Figure 2, wherein the windings 31 and 33 are made responsive to the current function of the output of the alternator.

The system and apparatus above described have been found in practice to achieve many important practical advantages, among which may be noted the fact that the system and apparatus, while utilizing in their preferred form an electronic conduction device of the thermionic type, function and act in a manner to preclude such changes in the operating characteristics of the thermionic device as result from aging, filament deterioration, or the like, from affecting the standard of operation of the regulator, the intended value of potential or current being dependably maintained constant irrespective of such changes in the vacuum tube as usually accompany long-continued use thereof. For example, the arrangements are such that a change in the operating characteristic of the thermionic device such as might result from a decrease in its thermionic emission, due to filament deterioration, has an effect upon the system corresponding to an increase above normal in the function to be maintained constant, the control circuits and related apparatus being thereupon promptly effective to rectify such a departure in an increasing direction from the normal value of the potential or current to be maintained constant.

Thus it will be seen that there has been provided in this invention an apparatus and system in which the various objects hereinbefore noted, together with many thoroughly practical advantages, are successfully achieved. It will be seen that the system and apparatus is of simple and thoroughly practical construction, is of dependable action, and is capable of achieving reliable and precise regulation.

We make no claim herein to the features of interrelation and coaction between the controlling or regulating winding or coil 20, its coacting magnetic circuit or parts, and the rectifying device 23 and the relation of these parts to the alternating current energizing circuit, having directed claims to such subject matter in our co-pending application Serial No. 494,173, filed November 7, 1930.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In apparatus of the character described, in combination, a source of alternating current, a carbon pile for controlling a function of the output of said source, a coil for controlling the pressure on said carbon pile, a three-element electronic conduction device, one of said elements being a control element, means connecting said coil and the controlled electronic conduction path of said device to be energized from said alternating source, and means including a plurality of differentially acting means, each responsive to a function of the output of said source and each including a core and the cores operating at different degrees of saturation, whereby said plurality of means are responsive in different degree to a function of the output of said source, for affecting said control element.

2. In apparatus of the character described, in combination, a source of alternating current, a carbon pile for controlling a function of the output of said source, a coil for controlling the pressure on said carbon pile, a three-element electronic conduction device, one of said elements being a control element, means connecting said coil and the controlled electronic conduction path of said device to be energized from said alternating source, a plurality of windings each responsive to a function of the output of said source, and a winding inductively related to said two windings to be responsive to the differential effects of the latter for affecting said control element.

3. In apparatus of the character described, in combination, a source of alternating current, a carbon pile for controlling a function of the output of said source, a coil for controlling the pressure on said carbon pile, a three-element electronic conduction device, one of said elements being a control element, means connecting said coil and the controlled electronic conduction path of said device to be energized from said alternating current source, a plurality of windings, each responsive to a function of the output of said source, core means related to said windings, one of said windings and said core means having a different saturation characteristic from said other winding and said core means, and means inductively related to said core means for affecting said control element.

4. In apparatus of the character described, in combination, a source of alternating current, a carbon pile for controlling a function of the output of said source, a coil for controlling the pressure on said carbon pile, a three-element electronic conduction device, one of said elements being a control element, means connecting said coil and the controlled electronic conduction path of said device to be energized from said alternating current source, a plurality of windings, each responsive to a function of the output of said source, core means related to said windings, one of said windings and said core means having a different saturation characteristic from said other winding and said core means, and means responsive to the differential inductive effects produced by said windings for affecting said control element.

5. In apparatus of the character described, in combination, a source of alternating current, a carbon pile for controlling a function of the output of said source, and means for controlling the pressure on said carbon pile, said means including a plurality of windings, each responsive to a function of the output of said source, core means related to said windings, one of said windings and said core means having a different saturation characteristic from said other winding and said core means, and means responsive to the differential inductive effects produced by said windings for affecting said carbon pile.

6. In apparatus of the character described, in combination, a source of alternating current, a carbon pile for controlling a function of the output of said source, and means for controlling the pressure on said carbon pile, said means including a rectifying device, a coil energized from said source through said rectifying device, two transformers having different saturation characteristics and having their primary windings connected to be responsive to the function of the output of said source to be regulated, and means controlled by the output of the secondary windings of said transformers for affecting the energization of said coil.

7. In apparatus of the character described, in combination, a source of alternating current, a carbon pile for controlling a function of the output of said source, and means for controlling the pressure on said carbon pile, said means including a rectifying device, a coil energized from said source through said rectifying device, two transformers having different saturation characteristics and having their primary windings connected to be responsive to the function of the output of said source to be regulated, a step-up transformer having its low tension winding connected in series with the secondary windings of said two transformers and said secondary windings being connected in opposition, the high tension winding of said step-up transformer being connected to affect the energization of said coil.

8. In apparatus of the character described, in combination, a source of alternating current; and means for regulating a function of the output of said source, said means including an electronic conduction device having a control electrode, a winding energized by alternating current, a winding connected to be responsive to a function of the output of said source, core means related to said windings, one of said windings and said core means having a different saturation characteristic from said other winding and said core means, and means controlled by the inductive effects produced by said windings for affecting said control element.

9. In apparatus of the character described, in combination, a source of alternating current; and means for regulating a function of the output of said source, said means including an electronic conduction device having a control electrode, a winding energized by alternating current, a winding connected to be responsive to a function of the output of said source, core means related to said windings, one of said windings and said core means having a different saturation characteristic from said other winding and said core means, a secondary winding inductively related to said first-mentioned winding, a secondary winding inductively related to said second-mentioned winding, and means connecting said control element to be responsive to the difference between the potentials induced in said secondary windings.

10. In apparatus of the character described, in combination, a source of alternating current; and means for regulating a function of the output of said source, said means including an electronic conduction device having a control electrode, a winding energized by alternating current, a winding connected to be responsive to a function of the output of said source, core means related to said winding, one of said windings and said core means having a different saturation characteristic from said other winding and said core means, a secondary winding inductively related to said first-mentioned winding, a secondary winding inductively related to said second-mentioned winding, and a step-up transformer of relatively high ratio having its low tension winding connected to be responsive to the difference in the voltages of said secondary windings and having its high tension winding connected to affect said control element.

11. In apparatus of the character described, in combination, a source of alternating current, a carbon pile for controlling a function of the output of said source, a three-element thermionic device, a coil for affecting the pressure on said carbon pile and connected to be energized from said source but through the uni-directionally conductive path included between the cathode and anode of said device, and means including an electromagnetically acting amplifier for connecting the control grid of said device to be responsive to changes in the function to be regulated.

12. In apparatus of the character described, in combination, a source of alternating current, a carbon pile for controlling a function of the output of said source, a three-element thermionic device, a coil for affecting the pressure on said carbon pile and connected to be energized from said source but through the uni-directionally conductive path included between the cathode and anode of said device, a winding, a winding responsive to changes in the function to be regulated, core means related to said windings, one of said windings and said core means having a different saturation characteristic from that of said other winding and said core means, and means inductively related to said core means for affecting said control grid.

In testimony whereof, we have signed our names to this specification this 12th day of March 1930.

FRANK W. GODSEY, Jr.
LOUIS H. VON OHLSEN.

DISCLAIMER 1,914,545.—*Louis H. Von Ohlsen* and *Frank W. Godsey, Jr.*, New Haven, Conn. SYSTEM AND APPARATUS FOR REGULATION. Patent dated June 20, 1933. Disclaimer filed August 17, 1935, by the patentees, the assignee, *The Safety Car Heating & Lighting Company*, assenting.

Hereby enter this their disclaimer to claims 8, 9, and 10 of the said Letters Patent which said claims are in the following words:

"8. In apparatus of the character described, in combination, a source of alternating current; and means for regulating a function of the output of said source, said means including an electronic conduction device having a control electrode, a winding energized by alternating current, a winding connected to be responsive to a function of the output of said source, core means related to said windings, one of said windings and said core means having a different saturation characteristic from said other winding and said core means, and means controlled by the inductive effects produced by said windings for affecting said control element.

"9. In apparatus of the character described, in combination, a source of alternating current; and means for regulating a function of the output of said source, said means including an electronic conduction device having a control electrode, a winding energized by alternating current, a winding connected to be responsive to a function of the output of said source, core means related to said windings, one of said windings and said core means having a different saturation characteristic from said other winding and said core means, a secondary winding inductively related to said first-winding and said core means, a secondary winding inductively related to said second-mentioned winding, and means connecting said control element to be responsive to the difference between the potentials induced in said secondary windings.

"10. In apparatus of the character described, in combination, a source of alternating current; and means for regulating a function of the output of said source, said means including an electronic conduction device having a control electrode, a winding energized by alternating current, a winding connected to be responsive to a function of the output of said source, core means related to said winding, one of said windings and said core means having a different saturation characteristic from said other winding and said core means, a secondary winding inductively related to said first-mentioned winding, a secondary winding inductively related to said second-mentioned winding, and a step-up transformer of relatively high ratio having its low tension winding connected to be responsive to the difference in the voltages of said secondary windings and having its high tension winding connected to affect said control element."

[*Official Gazette September 10, 1935.*]